(12) United States Patent
Kongable

(10) Patent No.: US 6,597,437 B1
(45) Date of Patent: Jul. 22, 2003

(54) CLOSED LOOP TRACKING AND ACTIVE IMAGING OF AN OUT-OF-BAND LASER THROUGH THE USE OF A FLUORESCENT CONVERSION MATERIAL

(75) Inventor: Albert W. Kongable, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/034,349

(22) Filed: Jan. 3, 2002

(51) Int. Cl.[7] .............................. G01C 3/00; G01C 3/08; G01C 5/00; G01T 1/20
(52) U.S. Cl. ....................... 356/3.01; 356/4.01; 250/365
(58) Field of Search ............................... 356/3.01–5.15; 250/361 R–365

(56) References Cited

U.S. PATENT DOCUMENTS

| | | | |
|---|---|---|---|
| 3,293,438 A | * 12/1966 | Davis, Jr. ................... | 250/552 |
| 3,953,667 A | 4/1976 | Layton et al. | |
| 4,497,065 A | 1/1985 | Tisdale et al. | |
| 4,737,028 A | 4/1988 | Smith | |
| 4,988,189 A | 1/1991 | Kroupa et al. | |
| 5,038,406 A | * 8/1991 | Titterton et al. ............... | 342/45 |
| 5,291,263 A | * 3/1994 | Kong ......................... | 356/153 |
| 5,303,878 A | 4/1994 | McWilliams et al. | |
| 5,345,304 A | 9/1994 | Allen | |
| 5,347,910 A | 9/1994 | Avila et al. | |
| 5,381,236 A | * 1/1995 | Morgan .................... | 250/201.7 |
| 5,528,354 A | 6/1996 | Uwira | |
| 5,651,512 A | 7/1997 | Sand et al. | |
| 5,784,196 A | 7/1998 | Sola | |
| 5,883,706 A | 3/1999 | Basu | |
| 5,969,676 A | 10/1999 | Tran et al. | |

\* cited by examiner

*Primary Examiner*—Thomas H. Tarcza
*Assistant Examiner*—Brian Andrea
(74) *Attorney, Agent, or Firm*—Burns, Doane, Swecker & Mathis, LLP

(57) ABSTRACT

A method for targeting includes illuminating an object, receiving reflected energy of a first wavelength, converting the reflected energy into an energy of a second wavelength, and detecting the energy of a second wavelength. A system for targeting includes a convertor having a first side and a second side, the convertor constructed to convert energy incident upon the first side at a first wavelength to energy passing through the second side at a second wavelength, and a sensor detecting the energy of the second wavelength.

20 Claims, 4 Drawing Sheets

CLOSED LOOP TRACKING AND ACTIVE IMAGING OF AN OUT-OF-BAND LASER THROUGH THE USE OF A FLUORESCENT CONVERSION MATERIAL

BACKGROUND OF THE INVENTION

1. Field of the Invention

The present invention relates generally to object targeting and more particularly to a device or system and its associated method for performing closed-loop tracking of laser rangefinder/designator returns and for using the laser rangefinder/designator returns as an illumination source for active imaging with the use of fluorescent conversion materials.

2. Background Information

Traditionally, military systems have used primarily 1.064 $\mu$m wavelength Nd:YAG lasers for target designation and precision guided weapon delivery. In recent years, these designator lasers have been designed to also produce laser output at 1.5 $\mu$m wavelength to provide a range-finding capability at an eyesafe wavelength.

By comparison, sensors most often employed to detect, identify, and select targets to be ranged and/or designated are based on a thermal imaging principle and are sensitive to radiation in the long-wave infrared (LWIR) waveband (7–12 $\mu$m) or, more recently, in the mid-wave infrared (MWIR) waveband (3–5 $\mu$m) waveband. Such imaging sensors are typically referred to in the art as forward looking infrared (FLIR) sensors.

In order for a FLIR sensor system to perform effectively, a laser must be able to immediately point at an object that has been identified by the sensor system. Thus, the accuracy of sensor systems is dependent on boresight accuracy between the lasers and imaging sensors, but such accuracy is presently limited by the ability to align and to maintain alignment between these devices. Alignment is usually achieved with the use of a boresight module assembly, where alignment accuracy is effected by such factors as mechanical tolerances and servo, tracker, and measurement errors. These factors have led to the design and use of very expensive boresight module assemblies requiring tight manufacturing tolerances. However, boresight accuracy in these assemblies is difficult to maintain, especially through extended use in operational environments that can produce very harsh thermal, shock, and vibrational conditions.

Attempts to provide closed loop tracking of a laser spot and/or active illumination for enhanced target recognition capabilities have followed one of two paths. The first involves the use of a FLIR sensor system with an additional sensor, such as a laser spot tracker (LST) or an active illumination near-IR imaging sensor (AITV). For example, U.S. Pat. No. 4,497,065 (Tisdale et al.), hereby incorporated by reference in its entirety, describes a system that includes both a passive sensor and an active sensor that is tuned to a predetermined laser wavelength. While these additional devices are sensitive to commonly-used laser wavelengths and can provide closed loop tracking and active illumination capability, their addition still requires a boresighting process. That is, a LST or an AITV needs to be boresighted to the FLIR sensor because, for example, the ability of either device to detect targets at night or in bad weather will be considerably poorer than that of a FLIR sensor. Therefore, accuracy problems as described above are not adequately addressed. This construction also requires the inclusion of associated optical path elements, support electronics, and power/cooling components. In short, the addition of a LST or an AITV for closed loop tracking and/or active illumination invariably results in an increase in total system cost, weight, and life cycle cost (e.g., more spare components required), while reducing the system reliability.

The other technique used involves using a FLIR sensor system with a focal plane array that is inherently sensitive to laser wavelengths. While effective in principle, this drastically reduces the focal plane array trade space available to system designers and often results in trade-offs that reduce system performance in other areas. In addition, focal plane arrays that are sensitive to both near-IR lasers and either the MWIR or LWIR FLIR bands are much more expensive than detector arrays sensitive only in either the MWIR or LWIR bands.

Finally, another factor that should be taken into consideration when designing a passive imaging sensor to be sensitive to common military Nd:YAG wavelengths is the proliferation of lasers in the modern battlefield with extremely high power output for use as directed energy weapons (DEWs). If a passive imaging detector array is sensitive to the Nd:YAG wavelength, it will also be susceptible to blinding or damage if illuminated by one of these DEWs.

It would be desirable to perform a closed-loop track of a laser spot on an object with a passive imaging sensor to allow a positive feedback to an operator of the laser pointing accuracy, and to use a laser rangefinder/designator as an illuminator for active imaging of potential targets.

SUMMARY OF THE INVENTION

Accordingly, the present invention is directed to a method of performing closed-loop tracking of laser rangefinder/designator returns and of using them as an illumination source for active imaging through the use of fluorescent conversion materials when an imaging array detector is not sensitive to the laser wavelength.

According to an exemplary embodiment of the present invention, a method for targeting is provided, including the steps of (i) illuminating an object with an energy, thereby creating a reflected energy of a first wavelength, (ii) receiving the reflected energy, (iii) converting the reflected energy into an energy of a second wavelength by fluorescent or phosphorescent conversion, and (iv) detecting the energy of a second wavelength.

According to another embodiment, a system for targeting is provided, including a convertor having a first side constructed to receive energy of a first wavelength and to convert the energy of a first wavelength into an energy of a second wavelength, and a distinct second side transmitting the energy of the second wavelength, the convertor comprising a fluorescent or phosphorescent material, and a sensor constructed to detect the energy of a second wavelength.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals.

DETAILED DESCRIPTION OF THE INVENTION

Figure 1:
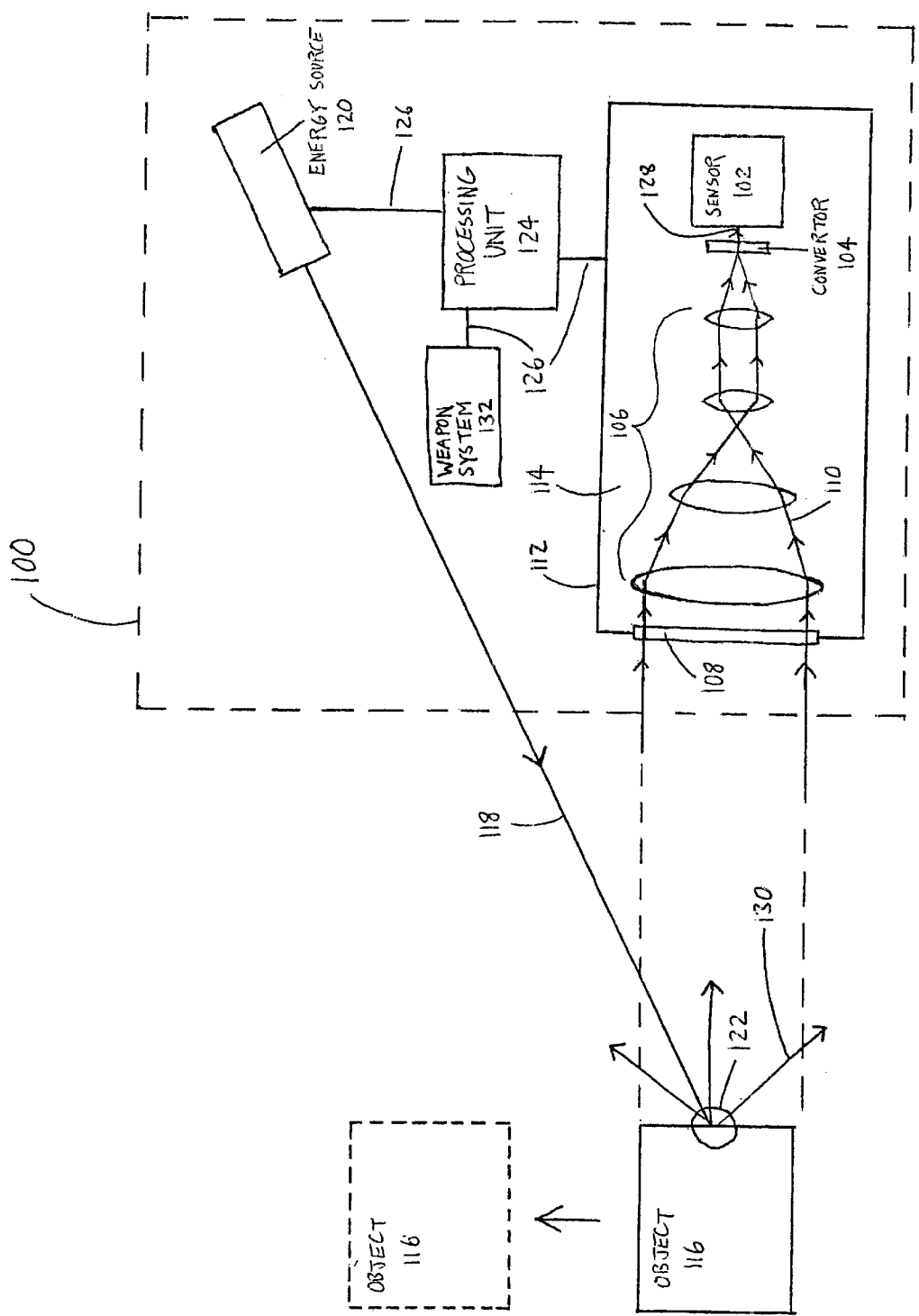
FIG. 1 is a schematic diagram of a targeting system in accordance with an exemplary embodiment of the present invention.

A method for targeting is represented in exemplary FIG. 1, where an object, such as object 116, is illuminated with an energy of a first wavelength, such as emitted energy 118. The term referred to herein as "targeting" generally describes any combination of the following processes performed with respect to an object: detection, identification, ranging, designating, and tracking. Additionally, "targeting" can also include any other related processes that are known in the art. An illumination of object 116 by emitted energy 118 creates a reflected energy of a first wavelength, for example, reflected energy 130, which can radiate in multiple directions from point of incidence 122 on object 116. Object 116 can be any stationary or moving object that can be detected, identified, and/or designated as a target. As non-limiting examples, object 116 can represent an airplane, a ground vehicle, or a projectile weapon. Emitted energy 118 originates from an energy source, such as energy source 120, which can be, for example, a laser device with rangefinder capabilities. For example, energy source 120 can be a 1.064 μm wavelength Nd:YAG laser designator with a 1.5 μm eyesafe laser rangefinder capability. In such a case, emitted energy 118 is laser radiation emitted at a wavelength of 1.064μm. Energy source 120 is not limited to this example, of course, and can alternatively take form as any energy-emitting device that can illuminate an object.

After an object is illuminated, reflected or returned energy (such as reflected energy 130) is received, for example, by a convertor, such as convertor 104. In an exemplary embodiment, emitted energy of a first wavelength (e.g., emitted energy 118) is reflected off an object (e.g., object 116) before being received by a convertor (e.g., convertor 104). Convertor 104 is shown in FIG. 1 as included in a sensor system 114, which is in turn included in a targeting system 100. Targeting system 100 is shown in FIG. 1 to include a sensor system 114, a processing unit 124, a weapon system 132, and energy source 120. These elements can all be mounted on a single component, such as housing 112, or can be separate and located remotely from each other. Housing 112 can be arranged as any convention or other housing means as in known in the art and can, for example, be attached to a vehicle or to weapon system 132.

Reflected energy, such as reflected energy 130, is then converted into an energy of a second wavelength, such as converted energy 128, by using fluorescent, or possibly phosphorescent, conversion. Convertor 104 is able to receive emitted energy at a first wavelength (e.g., reflected energy 130) and to radiate the emitted energy at a second wavelength (e.g., converted energy 128) by using fluorescent conversion. In an exemplary embodiment of the present invention, reflected energy 130 radiates at a wavelength outside of the operating bandwidth of a sensor 102, while converted energy 128 radiates at a wavelength within the operating bandwidth of sensor 102.

In the FIG. 1 example, convertor 104 is shown to be positioned between optical system 106 and sensor 102. Alternatively, convertor 104 can be positioned at any focal plane in optical system 106. In either embodiment, convertor 104 shields and protects sensor 102 from direct illumination of an emitted energy entering aperture 108 and originating from, for example, a directed energy weapon.

Figure 2:
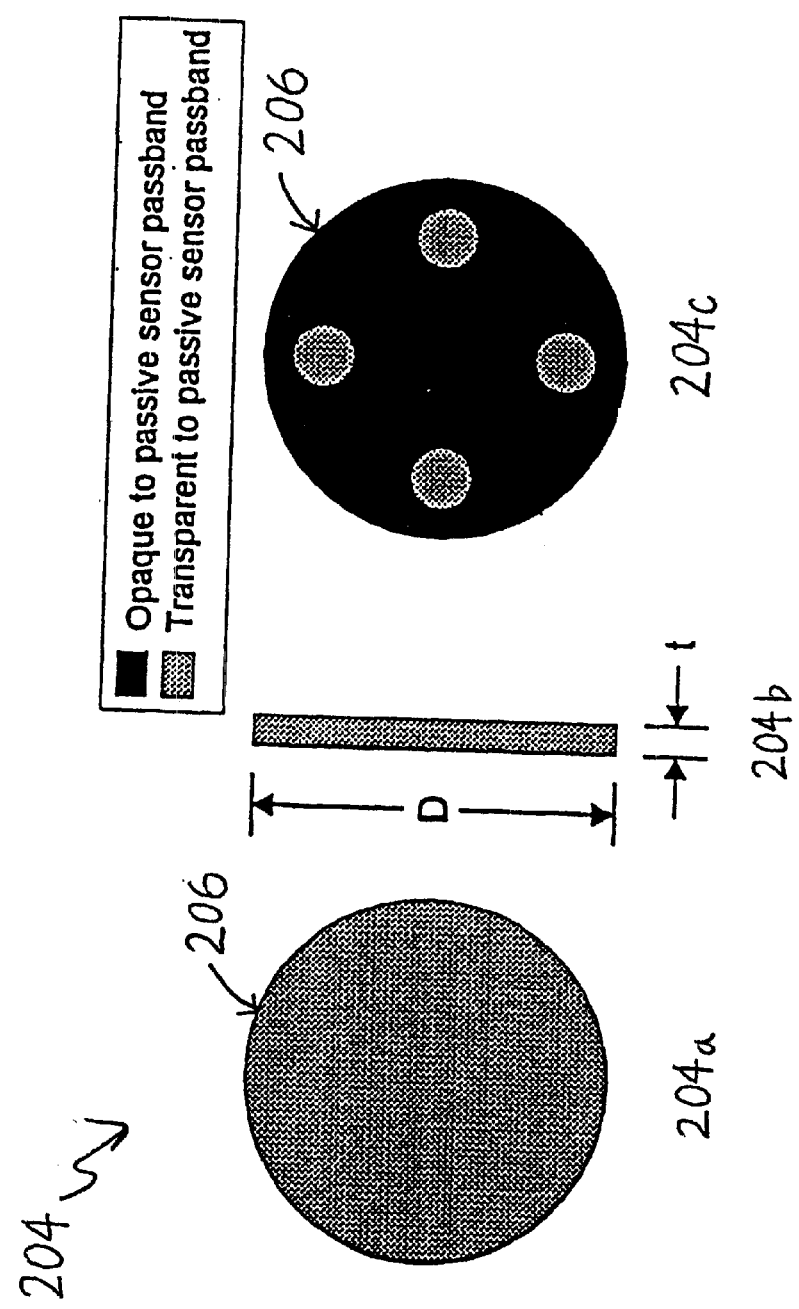
FIG. 2 illustrates a convertor in accordance with the embodiment of FIG. 1.

In the FIG. 2 example, convertor 104 is fabricated as a thin, flat, circular plate, which the figure shows in three views: front surface 204a, side surface 204b, and back surface 204c. Alternatively, convertor 104 can be arranged as any other shape that allows a detection of converted energy 128 by sensor 102. As shown in FIG. 2, front surface 204a and back surface 204c are different (i.e., on opposite sides of convertor 104). The major surfaces 204a and 204c can be polished and anti-reflection coated for both the laser wavelength and the passive sensor waveband. The outer surface profile 206 is arbitrary, but can be made circular for convenience of manufacture and mounting, or can be of any other desired shape. The front surface 204a of the plate (i.e., the surface facing aperture 108) can have a test pattern applied, with regions both opaque and transparent to radiation in the passive sensor's waveband. FIG. 2 shows a non-limiting example of a fluorescent converter plate design of thickness "t" and diameter "D" with a simple test pattern applied. Alternatively, any test pattern can be applied or convertor 104 can be used without any test pattern.

Convertor 104 can be made of a material possessing fluorescent conversion properties, or can alternatively be coated with such a material. Materials for rendering 1.064 μm radiation detectable to a MWIR sensor include, without limitation, the trivalent rare earth ions Dysprosium $(Dy^{3+})^{12}$, Praseodymium $(Pr^{3+})^3$, and Holmium $(Ho^{3+})$ doped into various hosts. These exemplary materials all have good optical quality and low attenuation of energy wavelengths within the operating bandwidth of sensor 102. Also, these materials have shown absorption bands ranging from 0.8 to 1.5μm, which cover the lasing wavelength of most diode lasers, laser rangefinders/designators, and eyesafe laser rangefinders. Fluorescent emission bands cover the MWIR FLIR band (3 to 5 μm) and extend as high as 7.2 μm, which cover the LWIR FLIR band.

Alternatively, convertor 104 can include laser dyes, which can provide very good conversion of short wavelengths to longer wavelengths. These dyes virtually cover the electromagnetic spectrum from UV out to about 1.2 μm and can be doped into either plastic host materials such as Plexiglas or into sol-gel type glasses to provide inexpensive fluorescent conversion materials with good optical quality and low attenuation of energy wavelengths within the operating bandwidth of sensor 102.

According to an alternative embodiment, the above-mentioned conversion material can comprise a phosphorescent material.

Detecting the energy of a second wavelength, such as detecting converted energy 128 with sensor 102, is also provided. Sensor system 114 includes a housing 112 that contains sensor 102, optical system 106, convertor 104, and aperture 108. In an exemplary embodiment, a first side of convertor 104 (e.g., front surface 204a shown in FIG. 2) receives reflected energy 130, which is then absorbed by convertor 104 and converted by fluorescent conversion into converted energy 128. As converted energy 128 radiates at a frequency within the operating bandwidth of sensor 102, sensor 102 can detect the location on a second side of convertor 104 (e.g., back surface 204c) where converted energy 128 radiates. Converted energy 128 can appear as a bright spot or image that is overlaid on a sensor image formed (e.g., by ambient radiation passing through convertor 104 with little or no attenuation) on the focal plane array of sensor 102.

Sensor 102 can represent a MWIR or LWIR FLIR sensor, or can alternatively be any other sensing means, conventional or otherwise. FIG. 1 shows optical ray paths 110 of sensor system 114, and the dotted lines extending from ray paths 110 also represent the field of vision for sensor system 114. That is, sensor system 114 can detect object 116 (with the use of energy source 120 and convertor 104) when object 116 is within its field of vision, as shown in FIG. 1. If object 116 is moving and travels to a position indicated by the arrow and dotted representation of object 116, sensor system 114 and/or targeting system 100 can be moved such that object 116 remains within the field of vision of sensor system 114. The movement of sensor system 114 and/or targeting system 100 can be achieved through any means known in the art, such as, but not limited to, multi-axial turret pivoting.

As shown in FIG. 1, processing unit 124 is connected to energy source 120, weapon system 132, and sensor system 114 via lines 126, which can be physical electrical lines or may represent a wireless connection. Through lines 126, processing unit 124 can send and/or receive command or data signals to energy source 120 and sensor system 114. Processing unit 124 can also be alternatively arranged within sensor system 114 (e.g., positioned in the interior space of housing 112). Processing unit 124 can be a portable computer that includes components known in the art, such as a monitor and a memory. Processing unit 124 can alternatively be a device linked via physical lines or wireless communication with a central computer, which can contain databases related to target characteristics, for example.

Processing unit 124 can be used as means for performing various targeting processes, any of which can be performed via a software algorithm (contained within processing unit 124 or in a remote location) or by any other conventional or unconventional means known in the art.

For example, based on the detecting of reflected energy 130, processing unit 124 can act as a means for performing closed loop tracking of an area on an object illuminated by energy of a first wavelength (e.g., point of incidence 122). Such tracking can be performed by any conventional or other means known in the art. By performing a closed loop track of an energy spot on object 116, the pointing accuracy of energy source 120 can be determined and can be used to increase designation accuracy for weapon delivery, for example. Thus, the need for a separate boresight module to achieve proper alignment between an energy source and a sensor system is eliminated. For example, during operation, processing unit 124 (or a human operator of targeting system 100) can readily determine and compare the pointing directions of energy source 120 and sensor system 114. In this way, closed loop tracking of point of incidence 122 provides positive feedback to a user or processing unit 124 of the pointing accuracy of energy source 120 with respect to sensor system 114. Thus, a step of adjusting alignment between an energy source (e.g., energy source 120) and a sensor system (e.g., sensor system 114) based on the detecting step is provided.

Processing unit 124 can also represent a means for performing active imaging of an object (e.g., object 116) based on energy detected by sensor 102. That is, energy source 120 can be used as an illuminator for active imaging of object 116. Such imaging using the converted returns from energy source 120 (i.e., converted energy 128) can be performed using any conventional or other means known in the art. By using active illumination imaging, the target detection and recognition capabilities of targeting system 100 can be enhanced.

Further, processing unit 124 can represent means for identifying object 116, based on the result of detection by sensor 102. That is, object 116 can be identified as a friendly, neutral, or enemy vehicle, for example, by comparing a detection by sensor 102 with a database located in processing unit 124 or remotely from. Object 116 can, of course, be identified to be any other object or life form. Additionally, identification of object 116 can be performed or supplemented by human monitoring of a display device attached to (or integrated with) processing unit 124.

Processing unit 124 can also be used as a means for selecting the object to be ranged and/or designated based on a resulting identification. In an exemplary embodiment, processing unit 125 can, based on an identification of object 116, determine whether a distance to object 116 should be calculated and also whether object 116 should be designated as a target, for example, for weapon delivery. If object 116 is selected to be ranged (or even if it is not), processing unit 124 can function as a means for determining a range to the object based on the detection of object 116. This instantaneous distance can be determined by processing unit 124 using any conventional or other means known in the art, such as, but not limited to, triangulation or time-delay methods. A determined range can be subsequently displayed to an operator of targeting system 100 (e.g., on a display device) and/or transmitted in a signal to weapon system 132.

Processing unit 124 can also represent a means for designating the object as a target based on detection of the object and a means for performing closed-loop tracking of the object. In designating object 116 as a target, processing unit 124 can control energy source 120 to move in accordance with a movement of object 116, thereby maintaining an illuminated spot on object 116 with emitted energy 118. Processing unit 124 can also transmit a signal to weapon system 132 indicating the status of object 116 as a target and can control weapon system 132 to remain aligned with energy source 120 as it tracks object 116. In this way, weapon system 132 can deliver a weapon (such as a missile) to object 116 designated by emitted energy 118. Thus, a step of delivering a weapon to the object based on the detection of energy 128 can be performed.

Figure 3B:
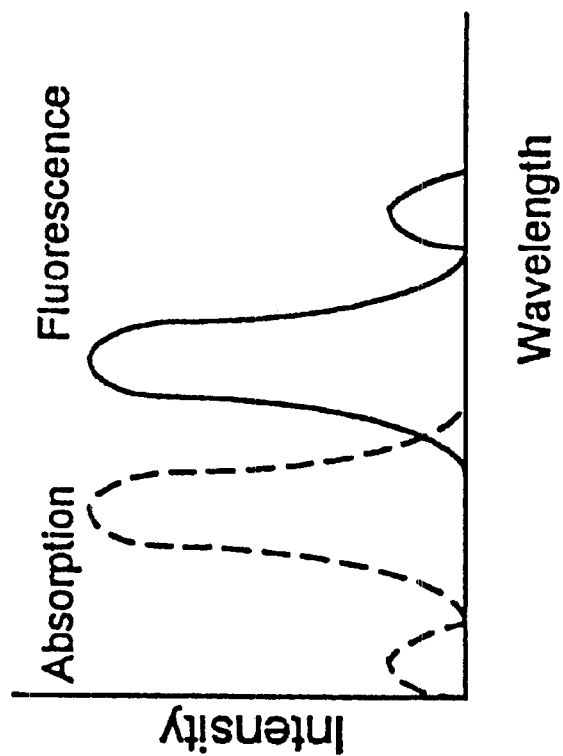
FIGS. 3a and 3b illustrate a process of fluorescence.
Figure 3A:
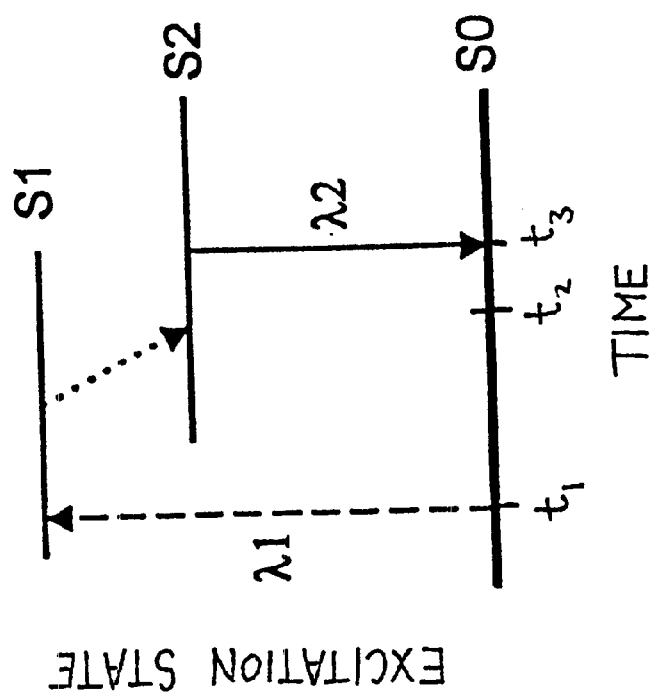

The process of conversion that is performed by convertor 104 is discussed below. The term "fluorescence" can be understood by reference to FIG. 3a, wherein at $t_1$ an ion or a molecule in the ground state $S_0$ absorbs an incident photon that falls within the characteristics absorption bands of that particular ion or molecule, and is elevated to an excited state $S_1$. At $t_2$, the excited ion/molecule relaxes, through vibrational or rotational interactions to a lower (less energy) excited state $S_2$ and then finally relaxes back to the ground (unexcited) state at $t_3$ through the emission of a photon of longer wavelength than the wavelength of the exciting photon. FIG. 3b illustrates the relationship between energy intensity and wavelength. Energy (i.e., a photon) of a shorter wavelength, as seen in FIG. 3b, is absorbed by an ion or a molecule but may not be "seen" by a passive sensor of a particular operating band (shown by the dotted line). Once the photon is emitted (as at $t_3$ in FIG. 3a), the wavelength is increased and the energy may be detected by the sensor.

In many molecular systems a second radiative decay path, through what is referred to as a "triplet state", is also available. When the radiative decay takes place through a triplet state, the process is referred to as "phosphorescence". One of the main differences observed between fluorescence and phosphorescence is the relative time scale of the process. Fluorescence usually takes on the order of $10^{-9}$ to $10^{-4}$ (or lesser or greater) seconds to occur, while phosphorescence often takes between $10^{-2}$ and $10^2$ seconds (or lesser or greater). Phosphorescent materials could, in some cases, be used in a convertor in accordance with exemplary embodiments (such as convertor 104), provided the longer decay times result in an acceptable increase of boresight times and an acceptable accuracy, which may be affected due to the "persistence" of the laser spot image.

Detailed spectroscopic data for one of the potential fluorescent conversion material choices, $Pr^{3+}:LaCl_3$ (hereafter referred to as "the material") has been published, for example, in "Radiative and Multiphonon,Relaxation of the Mid-IR Transitions of $Pr^{3+}$ in $LaCl_3$,", L. B. Shaw, S. R. Bowman, B. J. Feldman, and J. Ganem, IEEE Journal of Quantun Electronics, Vol. 32, No. 12, December 1996, pp. 2166–2172, hereafter referred to as "the Shaw document", the disclosure of which is hereby incorporated by reference in its entirety. The data shown in the Shaw document can be used to calculate a first approximation to the system sensitivities possible for a MWIR sensor using a fluorescent conversion convertor made of the material. The FIG. 4 example and Table 1 contain spectroscopic data disclosed in the Shaw document with respect to the material.

TABLE 1

Calculated Electric and Magnetic Dipole radiative Rates, Branching Ratios, and Integrated Emission Cross sections

| Transition | $\lambda$ ($\mu$m) | $A_{ed}$ ($S^{-1}$) | $A_{md}$ ($S^{-1}$) | $\beta$ | $\Sigma$ ($\times 10^{-18}$ cm) |
|---|---|---|---|---|---|
| $^3H_5 \Rightarrow\ ^3H_4$ | 4.8 | 24.8 | 1.18 | 1 | 2.3 |
| $^3H_6 \Rightarrow\ ^3H_5$ | 4.7 | 223.4 | 1.09 | 0.43 | 2.1 |
| $\Rightarrow\ ^3H_4$ | 2.4 | 33.0 | 0 | .57 | 0.72 |
| $^3F_2 \Rightarrow\ ^3H_6$ | 18 | 0.38 | 0 | .001 | 0.49 |
| $\Rightarrow\ ^3H_5$ | 3.7 | 116.3 | 0 | 0.143 | 6.2 |
| $\Rightarrow\ ^3H_4$ | 2.0 | 696.8 | 0 | .857 | 11.7 |
| $^3F_3 \Rightarrow\ ^3F_2$ | 7.2 | 0.61 | 0.32 | 0.0006 | 0.20 |
| $\Rightarrow\ ^3H_6$ | 5.2 | 36.3 | 0 | 0.025 | 3.9 |
| $\Rightarrow\ ^3H_5$ | 2.4 | 260.8 | 0 | 0.180 | 6.1 |
| $\Rightarrow\ ^3H_4$ | 1.6 | 1152.5 | 0.03 | 0.795 | 11.7 |
| $^3F_4 \Rightarrow\ ^3F_3$ | 23 | 0.02 | 0.006 | $3 * 10^{-5}$ | 0.06 |
| $\Rightarrow\ ^3F_2$ | 5.5 | 2.3 | 0 | 0.002 | 0.27 |
| $\Rightarrow\ ^3H_6$ | 4.0 | 79.9 | 0 | 0.081 | 5.6 |
| $\Rightarrow\ ^3H_5$ | 2.2 | 271.1 | 0.16 | 0.275 | 5.2 |
| $\Rightarrow\ ^3H_4$ | 1.5 | 630.7 | 0.55 | 0.641 | 5.6 |
| $^1G_4 \Rightarrow\ ^3F_4$ | 3.4 | 42.2 | 0.81 | 0.040 | 2.0 |
| $\Rightarrow\ ^3F_3$ | 3.0 | 7.7 | 1.05 | 0.008 | 0.30 |
| $\Rightarrow\ ^3F_3$ | 2.1 | 4.2 | 0 | 0.004 | 0.07 |
| $\Rightarrow\ ^3H_6$ | 1.8 | 290.8 | 0 | 0.268 | 4.0 |
| $\Rightarrow\ ^3H_5$ | 1.3 | 681.1 | 0.93 | 0.627 | 4.8 |
| $\Rightarrow\ ^3H_4$ | 1.0 | 57.4 | 0.91 | 0.054 | 0.25 |

Figure 4:
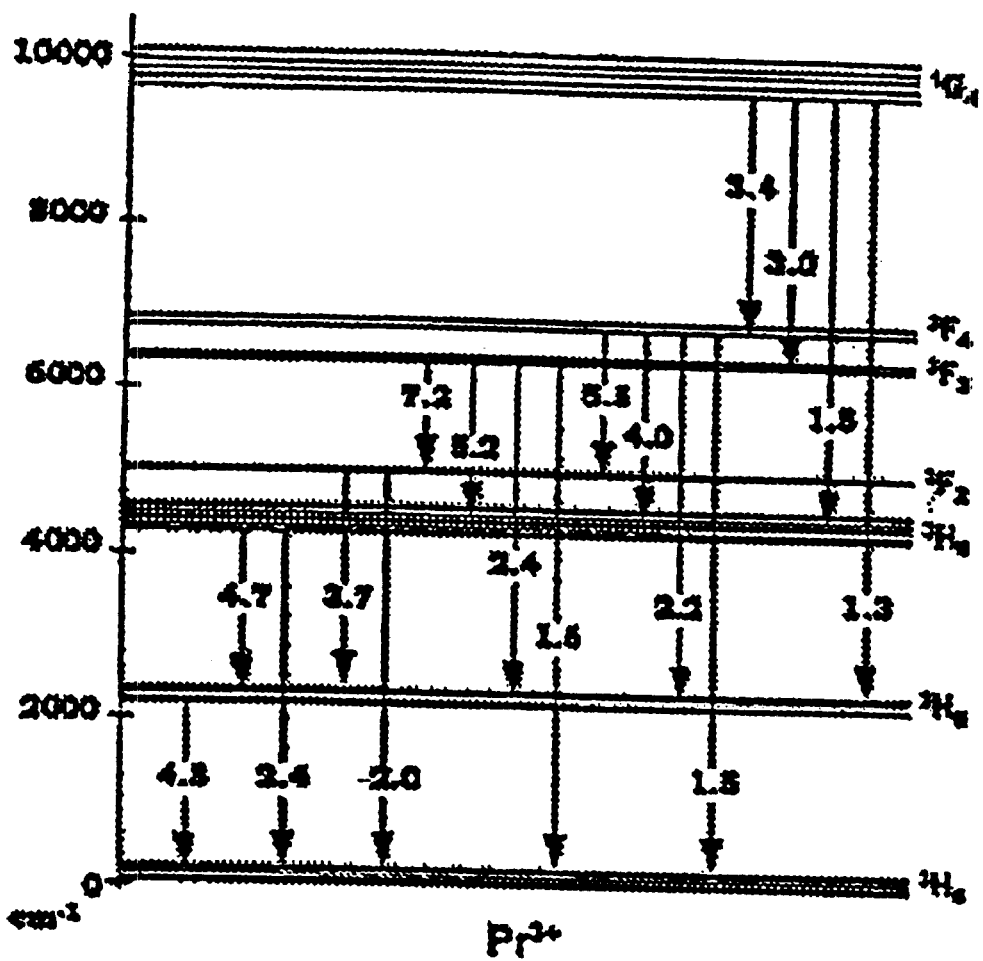
FIG. 4 is an exemplary diagram illustrating possible radiative transitions resulting from the use of Praseodymium doped into $LaCl_3$ as a fluorescent conversion material.

Data from FIG. 4, along with the branching ratios from Table 1, can be used to calculate the conversion efficiency of 1.06 $\mu$m radiation absorbed to MWIR radiation emitted ($\eta_{1.06}$) and the conversion efficiency of 1.57 $\mu$m radiation absorbed to MWIR radiation emitted ($\eta_{1.57}$). Table 2 contains a summary of the absorption spectra of the material taken again from the Shaw document, in particular the absorption coefficient, in cm−1, and the energy level that absorption of each wavelength excites the active ion to. The branching ratio data from Table I is used to calculate the integrated conversion efficiencies given in Table 2.

TABLE 2

Efficiencies calculated from published material data

| Parameter | Transition | Value |
|---|---|---|
| 1.06 $\mu$m absorption coefficient | $^3H_4 \Rightarrow\ ^1G_4$ | 0.03 cm$^{-1}$ |
| 1.06 $\mu$m conversion efficiency | | 0.8637 |
| 1.57 $\mu$m absorption coefficient | $^3H_4 \Rightarrow\ ^3F_3$ | 1.5 cm$^{-1}$ |
| 1.57 $\mu$m conversion efficiency | | 0.2017 |

Using this data, and making some assumptions about the characteristics of a typical MWIR sensor, a first order approximation of the Noise Equivalent Intensity (NEI) in Watts/cm$^2$ for the laser wavelengths at the system aperture can be calculated. The assumptions about the sensor parameters are:

1. Sensor waveband is 3.5 $\mu$m to 5.0 $\mu$m;
2. Sensor NEI over the 3.5 $\mu$m to 5.0 $\mu$m waveband is $5*10^{-14}$ W/cm$^2$;
3. Sensor optical efficiency of the path is the same at all wavelengths; and
4. Sensor aperture diameter is 10 cm.

The NEI of the sensor at the laser wavelength ($NEI_{laser}$) is approximately equal to the normal sensor NEI divided by the conversion efficiency of the fluorescent conversion material ($\eta_{fcm}$). The conversion efficiency of the fluorescent conversion material is calculated from:

$$\eta_{fcm} = 0.5 * \eta_{laser} * (1 - e^{-(2*t*\alpha)})$$

where $\eta_{laser}$ is the laser wavelength conversion efficiency from Table 2, $\alpha$ is the absorption coefficient from Table 2, t is the thickness of the fluorescent conversion material, the factor of 2 in the exponential is to account for double pass of the laser in the fluorescent conversion material, and the factor of 0.5 is an assumption that 1/2 of the MWIR photons generated will not reach the MWIR detector array. By performing the indicated calculations, the following values are determined:

$$\eta_{fcm1.06} = 0.015; \qquad\qquad 1.$$

$$\eta_{fcm1.57} = 0.12; \qquad\qquad 2.$$

$$NEI_{1.06} = 1.67*10^{-12}\ W/cm^2; \qquad\qquad 3.$$

and $$NEI_{1.57} = 2.1*10^{-13}\ W/cm^2. \qquad\qquad 4$$

There are two factors that must be kept in mind when comparing these calculated NEI's to the performance parameters of laser spot trackers and InGaAs cameras as conventionally used for closed loop tracking of laser spots. First, the data presented in Tables I and 2 were taken on samples that had relatively low doping concentrations of the active $Pr^{3+}$ ion. This made the spectroscopic transition data easier to obtain and more accurate, but resulted in low absorption coefficients. For an application such as closed loop tracking of a laser spot, a material with much higher doping concentration would probably provide an improvement in overall system efficiency. Second, the data in Tables I and 2 are based on measurements made on room temperature samples (293 K). Data has been presented in another document including an investigation of making the material emit laser energy at 7.2 $\mu$m wavelength by pumping the $^3F_3$ level with a 2 $\mu$m thulium laser that demonstrates the conversion efficiency of this transition increasing from 2.3% to 10% when the material was cooled from 293K to 150K. This document is "A 7-$\mu$m Preseodymium-Based Solid State Laser", S. R. Bowman, L. B. Shaw, B. J. Feldman, and J. Ganem, IEEE Journal of Quantum Electronics, vol. 32, No. 4, April 1996, the disclosure of which is hereby incorporated by reference in its entirety. Since in this closed loop tracking application the fluorescent conversion material will most likely be located inside the detector dewar, at temperatures around 70 K, there is a very high probability that the achievable 1.06 $\mu$m and 1.57 $\mu$m conversion efficiencies would be considerably higher than those calculated above.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for targeting, comprising the steps of:
   (i) illuminating an object with an energy, thereby creating a reflected energy of a first wavelength;
   (ii) receiving the reflected energy;
   (iii) converting the reflected energy into an energy of a second wavelength by fluorescent or phosphorescent conversion; and
   (iv) detecting the energy of a second wavelength.

2. The method of claim 1, comprising the step of:
performing closed-loop tracking of an area on the object illuminated according to step (i) based on detecting step (iv).

3. The method of claim 1, comprising the step of:
performing active imaging of the object based on detecting step (iv).

4. The method of claim 1, comprising the step of:
identifying the object based on detecting step (iv).

5. The method of claim 4, comprising the step of:
selecting the object to be at least one of ranged and designated based on the identifying step.

6. The method of claim 1, comprising the step of:
determining a range to the object based on detecting step (iv).

7. The method of claim 1, comprising the step of:
designating the object as a target based on detecting step (iv).

8. The method of claim 1, comprising the step of:
delivering a weapon to the object based on detecting step (iv).

9. The method of claim 1, comprising the step of:
adjusting alignment between an energy source and a sensor system based on detecting step (iv).

10. A system for targeting comprising:
    a convertor having a first side constructed to receive energy of a first wavelength and to convert the energy of a first wavelength into an energy of a second wavelength, and a distinct second side transmitting the energy of the second wavelength, the convertor comprising a fluorescent or phosphorescent material; and
    a sensor constructed to detect the energy of a second wavelength, wherein the emitted energy of a first wavelength is reflected off an object before being received by the convertor.

11. The system of claim 10, comprising:
an energy source for emitting energy.

12. The system of claim 10, comprising:
means for performing closed-loop tracking of an area on the object from which the, energy of a first wavelength is reflected, based on the detected energy.

13. The system of claim 10, comprising:
means for performing active imaging of the object based on the detected energy.

14. The system of claim 10, comprising:
means for identifying the object based on the detected energy.

15. The system of claim 14, comprising:
means for selecting the object to be at least one of ranged and designated based on an identification of the object.

16. The system of claim 10, comprising:
means for determining a range to the object based on the detected energy.

17. The system of claim 10, comprising:
means for designating the object as a target based on the detected energy.

18. The system of claim 10, comprising:
means for adjusting alignment between the energy source and the sensor based on the detecting energy.

19. The system of claim 10, wherein the convertor protects the sensor from a direct illumination of an emitted energy.

20. The system of claim 10, wherein the convertor comprises a fluorescent material.

* * * * *